Patented Jan. 8, 1929.

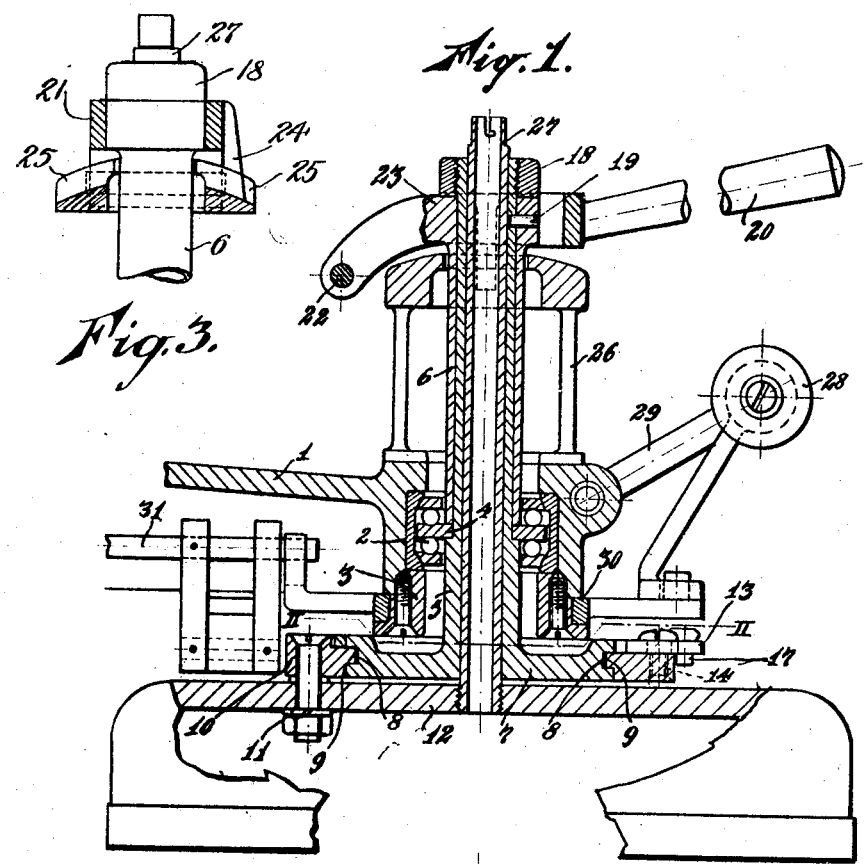

1,698,352

UNITED STATES PATENT OFFICE.

HERMANUS FRANCISCUS TOL, OF THE HAGUE, NETHERLANDS.

DEVICE FOR SUSPENDING IRONS FROM THE MOVABLE ARMS OF IRONING MACHINES.

Application filed December 5, 1927, Serial No. 237,963, and in the Netherlands October 12, 1927.

The invention relates to a device for suspending an iron from the movable arm of an ironing machine and it has for its object to enable the operator to easily rotate the iron about a vertical axis over 180° and to replace the iron by another one in a convenient manner.

The first mentioned manipulation is wanted in order to move the iron with its point in another direction, the second manipulation has the advantage, that various irons of different shape for special purposes may be quickly mounted.

According to the invention the device comprises a vertical spindle with a flange-shaped part at its lower side and means for supporting said spindle in a rotatable position in the movable arm. At the topside of the spindle a handle may be arranged for rotating the spindle with the iron fixed to it, in any desired direction and to lock it in the arm at various angles with respect to the movement of the iron in the machine.

The spindle may be made hollow in order to have a passage for introducing the heating medium into the body of the iron.

The iron may be attached to the flange of the spindle by means of a special ring, which may be coupled with the flange by a bayonet-joint, whereas means are provided for locking the ring to the flange.

The invention and its novel features as pointed out in the claims will be more fully understood with reference to the accompanying drawing in which one embodiment of the invention is illustrated by way of example.

Fig. 1 is a vertical section,

Fig. 2 is a horizontal section on line II—II of Fig. 1,

Figs. 3 and 4 are respectively a section in a plane perpendicular to that of Fig. 1 and a top view of the upper part of the device.

In the movable arm 1 of the ironing machine a double ball bearing 2 is arranged and locked by means of the gland 3. The ring 4 of this ball-bearing is fixed on a suspension spindle 5. This ring bears upon a collar of this spindle and is pressed thereon by means of a sleeve 6 and a nut 18 screwed upon the end of the spindle 5.

In this way the spindle 5 is rotatably suspended in the arm 1. Rotation of the spindle 5 in the sleeve 6 is prevented by the screw 19.

At the lower end of the spindle is provided with a flange 7, consisting of a circular disc, from which two diametrically positioned segments are removed. The remaining circular parts of the periphery of the disc are provided with a groove 8, in which inside ribs 9 of a ring 10 may slide. This ring 10 is by means of bolts 11 connected with the upper plate 12 of the iron body.

In the illustrated position (Fig. 1) the iron is suspended from the flange 7 of the spindle 5 by means of the ribs 9. The rotation of the ring 10 with respect to the flange 7 is prevented by a locking plate 13, attached to the ring 10 by a bolt 14. In the position illustrated in Fig. 2 the periphery of the plate 13 is meshing with a recess 15 in flange 7, by which this flange cannot rotate with respect to the ring 10. The plate 13 has also a recess 16 at its periphery and when the plate 13 is moved around the pin 14 so far that this recess 16 corresponds with the edge of flange 7, one may rotate the ring 10 (and the iron) with respect to the flange 7. In this way one may move the ribs 9 out of the groove 8 in the flange and disconnect the iron from the spindle. On rotating the spindle over 90° out of the illustrated position (Fig. 2) the grooves 8 lie just between the two ribs 9 of the ring and the iron falls out of the flange.

By the pin 17 in the locking plate 13 the angle of rotation is limited.

In order to rotate the spindle 5 with the iron in the arm, the spindle is provided at the top end with a handle 20. This handle 20 has a bifurcated part 21, lying around the upper part of the sleeve 6. The handle may swing around a pin 22 fixed in a crosspiece 23 which crosspiece is welded to the sleeve 6.

Laterally, against one of the arms of the bifurcated part 21, a projection 24 (Figs. 3 and 4) is arranged, which on lowering the handle may fit into corresponding holes 25, made in a member 26 (Fig. 1) upon the arm 1.

In the position illustrated in Fig. 1 the projection 24 is fitting into one of the holes of the member 26 and the spindle and the iron cannot be rotated. On lifting the handle 20, however, the projection 24 is removed from the hole and with the same handle 20 the spindle together with the iron may be rotated in any desired position. In lowering the handle the cam 24 may be placed into an other hole 25 and the spindle is locked again in the arm.

The hollow spindle 5 is at the inside provided with a tube 27. At the top of this tube the gas supply tube may be attached for heating the iron. If an electric heated iron is used the hollow spindle may be used for the passage of the conducting-wire.

I claim:—

1. A device for suspending an iron from the movable arm of an ironing machine, comprising a vertical spindle with a flange shaped part at its lower side, means for supporting said spindle in a rotatable position in said arm, means for attaching the iron to the flange shaped part of the spindle, means for rotating the spindle and means for fixing it at various angles in the movable arm.

2. A device for suspending an iron from the movable arm of an ironing machine, comprising a vertical hollow spindle with a flange shaped part at its lower side, adapted to be connected with the iron, means for supporting said spindle in a rotatable position in said arm, means for rotating the spindle and means for fixing it at various angles in the movable arm.

3. A device for suspending an iron from the movable arm of an ironing machine, comprising a vertical spindle, means for supporting said spindle in a rotatable position in said arm, means for connecting the iron with the lower end of said spindle, a crosspiece attached to said spindle at the topside, a bifurcated handle connected in a hinged position with said crosspiece and a projection on said handle adapted to fit into holes of a part of the movable arm.

4. A device for suspending an iron from the movable arm of an ironing machine, comprising a vertical spindle, means for supporting said spindle in said arm, a horizontal flange provided at the lower end of the spindle, a ring encircling said flange and adapted to be coupled therewith, means for attaching the iron to said ring and means for locking the ring to the flange.

In testimony whereof I affix my signature.

HERMANUS FRANCISCUS TOL.